C. G. BLAIR.
MEAT HOLDER.
APPLICATION FILED MAY 13, 1909.
930,722.
Patented Aug. 10, 1909.
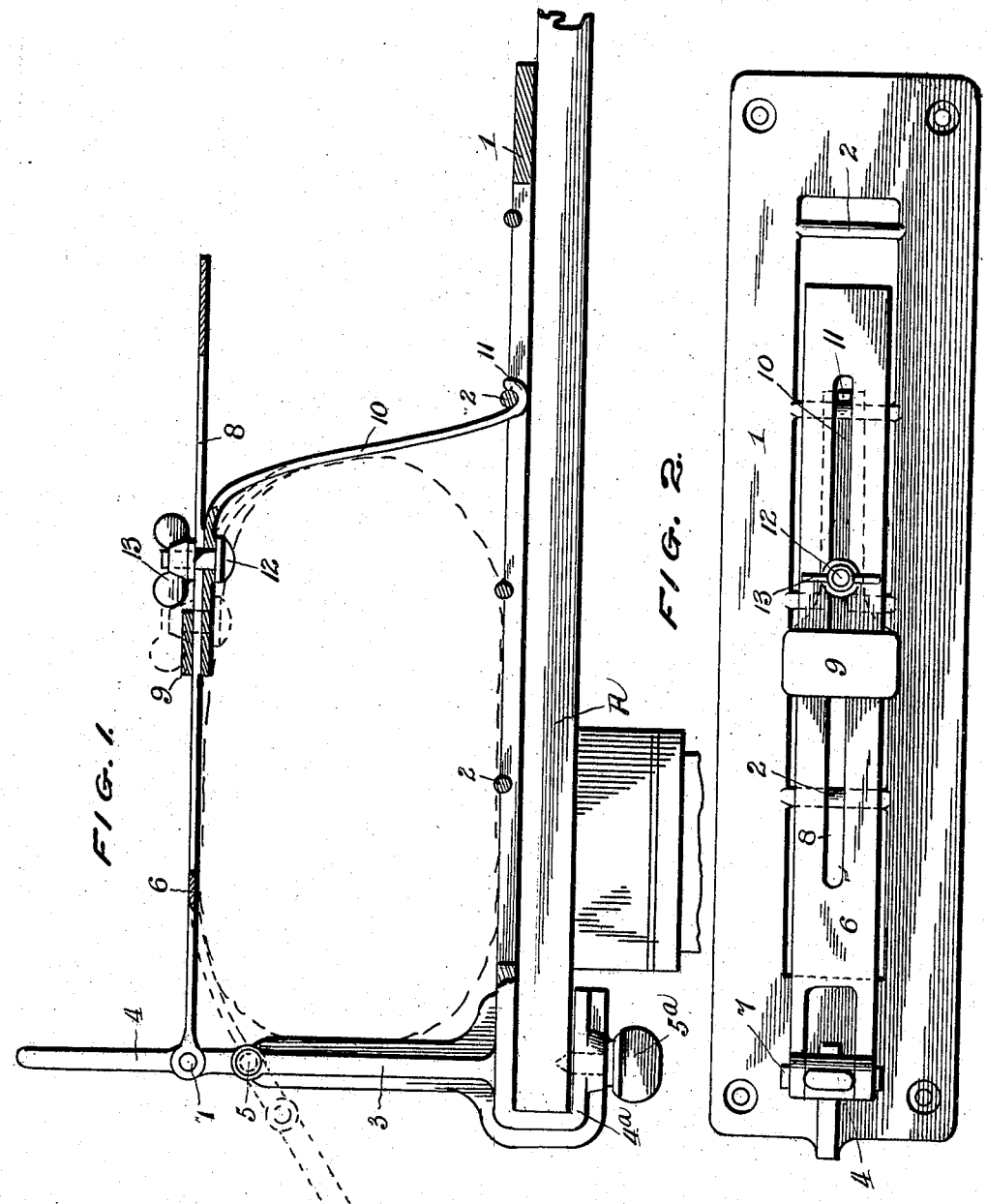
WITNESSES
C. K. Davies
Myron F. Clear
C. G. Blair.
INVENTOR
by C. L. Parker
Attorney

UNITED STATES PATENT OFFICE.

CHARLES G. BLAIR, OF GREAT CACAPON, WEST VIRGINIA.

MEAT-HOLDER.

No. 930,722.      Specification of Letters Patent.      Patented Aug. 10, 1909.

Application filed May 13, 1909. Serial No. 495,670.

To all whom it may concern:

Be it known that I, CHARLES G. BLAIR, citizen of the United States, residing at Great Cacapon, in the county of Morgan and State of West Virginia, have invented certain new and useful Improvements in Meat-Holders, of which the following is a specification.

My invention relates to meat holders, and more particularly to a meat holder which may be readily and quickly adjusted to different sizes of meat, for instance, hams, and which may be quickly manipulated to clamp and release the meat. Designed particularly for household use. Also for general use.

In the accompanying drawings, which illustrate my invention, and form a part of this specification, Figure 1 is a side elevation of my improved meat holder illustrating the practical application of the same, and, Fig. 2 is a plan view thereof.

Referring to these drawings, I provide a base plate 1, which, in its length, is provided with a central longitudinal slot spanned at equidistantly spaced points by transverse arms 2, and provided at one end with an upright arm 3, and with a downwardly inturned extension 4 below said arm 3, through which a thumb nut 5 is tapped for engagement with, and to support said plate 1 upon a table or like support A. Pivotally mounted at its enlarged end at 5, upon the upper end of the upright arm 3, is a lever 4, to which above its pivot 5 and intermediate its ends is pivotally secured one end of a flexible clamping plate 6, by a pivot pin 7.

The clamping plate 6 is provided in its length, with a longitudinal slot 8, and projects through a slotted cross piece 9 at the upper angular end of a downwardly extending plate 10 having its lower end provided with a hooked extremity 11, for engagement with a selected one of the transverse ribs or arms 2, spanning the slot in the base plate 1. A threaded stud 12 maintained within and projecting upwardly through the upper angular end of plate 10, adjacent its cross piece 9, extends also through the longitudinal slot 8 of flexible plate 6, and has a wing nut 13 engaging thereon to clamp plates 6 and 10 in a position coinciding with the selected one of the transverse ribs 2 to which the lower extremity 11 of plate 10 is engaged. Thus, a section of meat, which is designated in dotted lines in Fig. 1, is held between upright arm 3 on one side and plate 10 on the opposite side, which is adjusted to it, with flexible plate 6 extending upon the top thereof, whereby when lever 4 is rotated upon its pivot 5, and swung outwardly to the position shown in dotted lines, the flexible plate 6 will be drawn longitudinally clamping plate 10 against its respective side, and the end of said flexible plate 6 connected to said lever, will be drawn downwardly to further clamp the meat.

Having fully described my invention, I claim:

1. In a meat holder of the character described, the combination of a base plate provided with an upstanding arm, and with a clamp beneath said arm for engagement with a suitable support, said base plate being further provided with a longitudinal slot, and with spaced ribs transversely of said slot, a lever pivotally mounted at one end upon the end of said upright arm, a flexible plate having one end pivotally secured intermediate the ends of said lever, and an adjusting plate adjustably secured at one end of said flexible plate and provided at its opposite end with means to engage a selected one of the transverse ribs of said base plate, substantially as described.

2. In a meat holder of the character described, the combination of a base plate provided with an upstanding arm and with a support engaging clamp below said arm, and further having a longitudinal slot and spaced ribs transversely spanning said slot, a lever pivotally mounted at one end upon the end of said upstanding arm, a flexible plate having one end secured intermediate the ends of said lever, and provided with a longitudinal slot, an adjusting plate provided with an upper angular arm having a selected cross piece through which the opposite end of said flexible plate projects, a threaded stud projecting through the angular upper end of said adjusting plate, and through said longitudinal slot of said flexible plate and provided with a clamping nut to adjustably connect the same, said adjusting plate being provided at its lower end with a hooked extremity to engage a selected one of the transverse ribs of the said base plate, substantially as described.

In testimony whereof I affix my signature in presence of two witnesses.

CHARLES G. BLAIR.

Witnesses:
 ADAM C. SPRING,
 JAMES R. KIDWELL.